US009299261B2

United States Patent
Jones

(10) Patent No.: US 9,299,261 B2
(45) Date of Patent: Mar. 29, 2016

(54) DEVICE AND PROCESS FOR DETERMINING A RUNWAY STATE, AIRCRAFT INCLUDING SUCH A DEVICE AND PILOTING ASSISTANCE SYSTEM USING SAID RUNWAY STATE

(75) Inventor: Logan Jones, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 297 days.

(21) Appl. No.: 13/562,543

(22) Filed: Jul. 31, 2012

(65) Prior Publication Data

US 2014/0012437 A1    Jan. 9, 2014

(30) Foreign Application Priority Data

Aug. 1, 2011    (FR) .................................... 11 57041

(51) Int. Cl.
| | | |
|---|---|---|
| G08G 5/06 | (2006.01) | |
| B60T 8/1763 | (2006.01) | |
| B60T 8/17 | (2006.01) | |
| B60T 8/172 | (2006.01) | |
| B64C 25/42 | (2006.01) | |
| G08G 5/00 | (2006.01) | |

(52) U.S. Cl.
CPC . *G08G 5/06* (2013.01); *B60T 8/172* (2013.01); *B60T 8/1703* (2013.01); *B64C 25/42* (2013.01); *G08G 5/0013* (2013.01); *G08G 5/0021* (2013.01); *G08G 5/0086* (2013.01); *G08G 5/065* (2013.01); *B60T 2210/12* (2013.01); *B60T 2210/13* (2013.01)

(58) Field of Classification Search
CPC combination set(s) only.
See application file for complete search history.

(56) References Cited

U.S. PATENT DOCUMENTS

| 8,428,795 B2 | 4/2013 | Caule | |
|---|---|---|---|
| 2004/0225423 A1* | 11/2004 | Carlson et al. | 701/36 |
| 2005/0240321 A1* | 10/2005 | Darke | 701/3 |
| 2006/0243857 A1 | 11/2006 | Rado | |
| 2007/0142996 A1* | 6/2007 | Lee | 701/96 |

(Continued)

FOREIGN PATENT DOCUMENTS

| DE | 40 10 507 | 10/1991 |
|---|---|---|
| DE | 10 2005 046 612 | 4/2007 |

(Continued)

OTHER PUBLICATIONS

Jingang Yi, A Fault Tolerant Longitudinal Control and Tire/road Friction Estimation System for Automated Highway Systems (AHS), ProQuest Information and Learning Company, 1st Edition, p. 4 and 126-152.*

(Continued)

*Primary Examiner* — John R Olszewski
*Assistant Examiner* — Gerrad A Foster
(74) *Attorney, Agent, or Firm* — Nixon & Vanderhye P.C.

(57) ABSTRACT

This invention relates to a device and process for determining an airport runway state (12), as well as for using such data. The process includes: acquisition (A1) of measurement data pertaining to at least one physical size of an aircraft (10), during the take off or landing roll phase of the aircraft on said runway; obtaining (A2), using the data acquired, a plurality of estimated adhesion values "μ" of the runway, corresponding to a respective plurality of taxiing moments of the aircraft; obtaining (A3), using the data acquired, a slip ratio value "s" of at least one of the aircraft's wheels for each said taxiing moment, so as to obtain (A4) a plurality of coupled data points [s,μ]; and determination of a runway state by comparing (A5.2) the coupled data points [s,μ] profile with at least one predetermined profile.

22 Claims, 5 Drawing Sheets

(56) References Cited

U.S. PATENT DOCUMENTS

2008/0030073 A1   2/2008  Goodman et al.
2009/0210128 A1*  8/2009  Fujimoto et al. ............... 701/84
2009/0292483 A1* 11/2009  Journade et al. ............... 702/33

FOREIGN PATENT DOCUMENTS

| FR | 2 897 593 | 8/2007 |
| FR | 2 930 669 | 10/2009 |
| GB | 2 243 657 | 11/1991 |
| WO | 96/14564 | 5/1996 |

OTHER PUBLICATIONS

French Search Report dated Feb. 28, 2012 in FR 1157041.

* cited by examiner

DEVICE AND PROCESS FOR DETERMINING A RUNWAY STATE, AIRCRAFT INCLUDING SUCH A DEVICE AND PILOTING ASSISTANCE SYSTEM USING SAID RUNWAY STATE

This application claims priority to French Patent Application No. 11 57041 filed Aug. 1, 2011, the entire contents of which are hereby incorporated by reference.

BACKGROUND OF THE INVENTION

1. Field of the Invention

This invention relates to a device and process for determining the state of a runway, as well as to an aircraft's takeoff and/or landing assistance system and process, and to aircraft equipped with such devices and systems.

2. Discussion of Prior Art

During landing and takeoff phases, and more generally when a plane is on the take off or landing roll, being aware of the state of the runway surface is of the utmost importance. Indeed, predicting the plane's braking performance depends on said awareness. Thus it is possible: —To best estimate the distance needed to stop the plane in a concern for safety, —To not overestimate this stopping distance needed to bring the plane to a standstill and therefore to not overly penalize the runway and plane's utilization operations.

Yet, a plane's braking performances on a runway said to be contaminated are very difficult to predict because of the difficulty in having a reliable and accurate knowledge of the runway's contribution to the plane's deceleration, in particular in terms of adhesion and projection drags and displacements in the case of thick contaminants. Contaminants can be any item that comes to rest on the "original" runway, such as for example, rubber left during previous landings, oil, rainwater forming a more or less uniform layer on the runway, snow, ice, etc. Knowledge of such a contribution to the state of the runway may seem beneficial to improve landing systems such as the one described for example in the document FR-2897593. This knowledge may also prove to be important to make the take-off of planes more secure, as the latter must estimate, for example, the point of no return of the runway, where a completely safe emergency braking on the remaining part of the runway is no longer possible. Initial solutions to estimate the state of the runway have already been implemented, but today, the runway's adhesion measurements are very difficult, not very effective, not reliable and hard to transpose from the context of the measurement means used to that of a plane on the take off or landing roll on the same runway.

In particular, complete and reliable solutions should estimate a runway state: —independently of the measurement means used; —useable by any other plane, and in particular by its landing system; —updated on a regular basis; —correlated with a runway position; —for several runway points or portions in order to cover the entire runway; —without needing to close the runway.

In particular, it is known that the measurement of the runway's adhesion thanks to friction engines or "mu-meters", for example towed vehicles or special vehicles, that provide results that are ill-assorted, potentially inconsistent among themselves, not representative for an airplane because of the different scales of phenomena such as the loads and tire performance. Therefore, these results are not used by the other planes, but only internally by the airports in order to obtain an idea of the deterioration of the runway. In addition, such measurements require closing the runway for several minutes, which may be harmful considering the ever increasing airport traffic. The estimate of a runway's state by "mu-meters" is therefore not usually updated on a regular basis.

In practice one also resorts to visual and manual inspections of the runway at several points thereof, by an agent, in order to obtain a type and thickness of the contaminant along the runway. However, this approach only provides an indication that is strongly based on the location where the inspection was carried out. Furthermore, it requires closing the runway for long periods of time (around twenty minutes), which is not compatible with airport traffic. The estimate of the runway's state is therefore not updated on a regular basis using a visual inspection.

Also, "Reported Braking Actions" or "Pilot Reports" (PIREP) are actually what the plane's pilot experiences about his braking performances with a division into several simple levels of evaluation: for example good/good-medium/medium/medium-poor/poor/nil (in practice indicated according to the following English terms: "good"/"good-medium"/"medium"/"medium-poor"/"poor"/"nil") from which it is possible to manually notify the plane on approach for landing. In airports with traffic, as the planes follow each other for example every two minutes, regular estimations are therefore obtained.

However, this solution is subjective, depends on the plane and takes into account contributions other than wheel braking (as the pilot is not able to identify the exact part of the various means of braking of his plane: aerodynamic drag, engine thrust or counter-thrust and wheel braking).

On the contrary, this invention concerns a solution for estimating the state of the runway that is more reliable, in particular objective and representative of airplane behavior. In this area, analysis solutions applicable later on the ground have already been developed to estimate a posteriori the state of the runway at the time of an incident or an accident during service, or to validate trial flights in "real time". These solutions are usually based on measurements of the plane's deceleration during landing. Then, on the ground, delayed treatments are performed to estimate the adhesion of the runway based on this measured deceleration, by subtracting in particular aerodynamic, engine and contaminant components or contributions, resulting from models using other measurements performed on or outside the airplane.

These treatments performed, take into account the type of plane involved because the measurement of the deceleration alone does not allow for an easy utilization by another plane. In addition, these treatments are long, manual and not compatible with an intensive use of an airport where an estimation of the runway state is required in a brief period before the next plane performs a take off or landing roll on the runway.

Furthermore, document US 2006/243857 is a method and a device to estimate features pertaining to a landing runway. A real time treatment is carried out during which various airplane or external parameters are acquired and recorded. From these recorded parameters, an estimation of the deceleration due solely to braking is performed in particular based on the deceleration $A_x$ of the airplane, the engine thrust $A_{reverse\ thrust}$, and the aerodynamic drags $A_{drag}$. A friction profile "$\mu$" is then established in order to determine if the plane is at braking limit or not, and warn the pilot accordingly.

However, this information is simply not useable in a satisfactory timeframe to notify the approaching planes.

In the publication FR 2 930 669 (also published under the reference US 2009/029483), such an adhesion or friction profile $\mu$ (usually identified as "friction curve" in the literature) obtained for the current airplane is compared to a set of pre-established adhesion profiles in order to obtain a characterization of the runway state.

One difficulty in determining the state of the runway resides in the evaluation of an adhesion coefficient µ value concerning the physical environment of the plane, where this physical environment not only concerns the runway but also the plane itself (for example its tires).

For example, a small plane may experience a maximum adhesion µ of 1.3 on a dry runway and of 0.8 on a wet runway, while a large carrier (Very Large Aircraft or VLA) experiences a maximum adhesion µ of 0.6 on the same dry runway and of 0.4 on the same wet runway.

In this example, the 0.6 value of µ does not necessarily indicate a dry runway. When this is the case, it is for a specific plane, at a certain speed, using specific tires and landing at a certain temperature.

From these examples, the sole estimation of an adhesion coefficient µ does not make it possible to correlate, in a reliable and precise manner, the measurements with a runway state.

SUMMARY OF THE INVENTION

This invention tries to mitigate all or part of these inconveniences and, with this in mind, targets in particular a process for determining a landing runway state, including the following steps:

acquiring measurement data in relation to at least one physical size of an aircraft, during an aircraft on the take off or landing roll phase on said runway;

obtaining, using the acquired data, a plurality of estimated adherence µ values of the runway, corresponding to a plurality of several respective moments of aircraft on the take off or landing roll;

obtaining, using the acquired data, a slip ratio value "s" of at least one wheel of the aircraft for each said on the take off or landing roll moment, so as to obtain several coupled data points [s,µ];

determining a runway state by comparing the coupled data points [s,µ] profile to at least one predetermined profile.

This invention increases the precision and reliability of the estimation of a runway's state. This is in particular due to the use of the slip ratio in association with the adhesion µ, where said ratio makes it possible to take into account the operational conditions of the aircraft's braking system that make the measurements. The runway state obtained by comparison with theoretical profiles proves to be independent from the aircraft contrary, for example, to taking into account the adhesion µ alone, or taking into account a slip speed (dependent on the plane involved) as described in the publication WO 96/14564.

Indeed, the slip ratio combined with the adhesion µ makes it possible to recopy the degree of braking requested by the crew: for example a pilot who lands on the runway may immediately seek maximum braking, then after a few seconds, seeing that the braking is efficient, let up on said braking until it reaches the desired exit. Taking into account this degree of braking using the profile µ-slip ratio makes it possible, according to the invention, to better correlate the adhesion measured with the real state of the runway.

The state of the runway used to qualify the state of contamination of the runway as set forth in the invention is made yet more independent of the aircraft in which the measurements are made. It can thus be used by any other aircraft with characteristics different from the first. By way of illustration, the state of the runway may take on the form of a characterization of the state of the runway by identifying a type and thickness of contaminant. As a variant, it may indicate a level of adhesion of the runway.

The measurements and estimation of the state of the runway may in particular be performed on-board the aircraft involved, while the later is in the final taxiing phase (towards its parking spot for instance). Thus, the information that results from the state of the runway may be forwarded in due time to the approaching aircrafts.

Correlatively, the invention also relates to a device for determining a landing runway state, including: —a measurement data acquisition module in relation to at least one physical size of an aircraft, during a take off or landing roll phase of the aircraft on said runway; —a calculator to obtain, using the acquired data, a plurality of estimated adhesion "µ" values of the runway, corresponding to a plurality of respective moments on the take off or landing roll of the aircraft; —a calculator to obtain, using the acquired data, a slip ratio "s" value of at least one wheel of the aircraft for each said moment on the take off or landing roll, so as to obtain a plurality of coupled data points [s,µ]; —a module for determining a runway state by comparing the coupled data points [s,µ] profile to at least one predetermined profile.

The device as set forth in the invention shows advantages similar to those of the process described above, in particular that of providing an estimate of a runway state in a more reliable and more precise manner.

Another aspect of the invention concerns an aircraft piloting assistance system, in particular for landing the aircraft, including at least one device as presented above as equipment on at least one aircraft, and a ground station able to receive an information item about the state of a runway determined by said device and able to transmit this runway state information item to at least one other aircraft, in particular during the approach phase. Use of this information by the aircraft in the approach phase can vary, for example, by displaying said information for the pilot or by using it as input for a landing assistance system.

Similarly, the invention also addresses an aircraft piloting assistance system, including several runway state determination devices as described above and as part of the equipment of a plurality of corresponding aircraft, and a ground station for the retransmission of the runway states, where said ground station is able: —to receive runway states determined by said plurality of devices; —to merge said runway states received; and—to transmit at least one information item about the runway state that results from said merger to at least one other aircraft, so as to provide an enhanced mapping of the runway state to said at least one other aircraft.

Thus, one can obtain a better mapping of the landing runway for the aircraft in the approach phase. Of course, various information merger and storage policies can be put in place, like the one for taking into account weather changes at the airport, or even how old the information is and its replacement with more recent corresponding information (same position on the runway). Correlatively, the invention also concerns an aircraft landing assistance process which includes steps that relate to the means of the above system.

Another aspect of the invention concerns an aircraft that includes at least one device for determining the state of a runway as described above. The assistance process and systems, as well as the aircraft, have characteristics and advantages similar to the determination process and device explained earlier. Optional characteristics of the invention are, in addition, defined in the dependent claims.

In particular, in one method of execution of the invention, determining the state of a runway by comparison includes selecting, from a set of predetermined profiles each associated with a different runway state, the predetermined profile closest to the coupled data points [s,μ] profile. The selection may rest on the calculation of a distance between said coupled data point profile and each of the predetermined profiles, for example the distance L2 between the values μ for each slip ratio s obtained, or vice versa between the values s for each coefficient μ obtained, or an advantageous mix thereof. This results in a quick determination, based on simple operations.

According to a variant, determining a runway state by comparison includes obtaining a plurality of slope values "k" of the coupled data points [s,μ] profile for a plurality of adhesion values μ, in order to obtain a plurality of coupled data points [k,μ]; and determining, among a set of predetermined areas in space [k,μ] and each associated with a different runway state, an appurtenance zone of the majority of said coupled data points [k,μ]. The slope value can be obtained by a simple linear regression between two or three successive coupled data points around a value μ being considered. This measure rests on the fact that the slope of the profile μ-slip ratio is strongly correlated to the runway state, especially in the braking area not limited by the adhesion. Therefore, this measure guarantees an effective estimation of the runway's state.

As will be seen, environmental parameters are taken into account in order to obtain the most precise estimation. In particular, at least one mechanical stiffness value relative to the tire of the aircraft's wheel is calculated using measurement data acquired while on the take off or landing roll, and the predetermined zones are defined using the at least one predetermined profile, which varies based on the mechanical stiffness value calculated.

In one variant of the use of several predetermined profiles or of the slope "k", the predetermined profile is a parametric profile, and determination of a runway state by comparison includes the adjustment (or "fitting" according to the English term) of the parametric profile on said coupled data points [s,μ] and the determination of a runway state from at least one characteristic value of the adjusted profile. This approach makes it possible to determine even more accurately the state of the runway, because in particular, several characteristic values of the adjusted profile can be taken into account.

As an example, the at least one characteristic value representative of the runway state may be chosen among the set including adjusted parameters of said parametric profile, one maximal adhesion value $\mu_{max}$ and one initial slope value (meaning before reaching maximal adhesion $\mu_{max}$). In particular, said characteristic value of the adjusted profile includes one maximal adhesion value of said adjusted profile.

In one method of execution of the invention, said predetermined profile varies based on aircraft parameters and determined environmental parameters of the take off or landing roll moments in question. Taking these parameters into account makes it possible to best fine tune the estimation of the runway state. In particular, said predetermined profile is in the form of $f(s, \mu_k, \mu_s, a, F_z, c_p)$ where, at the corresponding take off or landing roll moments, $\mu_k$ is a dynamic adhesion coefficient, $\mu_6$ is a static adhesion coefficient, a represents the area of contact between the aircraft's wheel tire and the runway, $F_z$ is a vertical load applied on the wheel's axis and $c_p$ is a mechanical stiffness value relative to the wheel's tire. Note that said adhesion used in the profile [s,μ] combines the dynamic coefficient and the static coefficient. Of course, these various parameters can be calculated using measurement data acquired as described later.

According to one specific characteristic of the invention, a slip ratio "s" value of a wheel of the aircraft for one take off or landing roll moment is obtained by calculating the following ratio:

$$\frac{V_x - V_c}{V_x}$$

where $V_x$ is the aircraft's ground speed at that take off or landing roll moment and $V_c$ is the linear speed (meaning the peripheral or circumferential speed) of the wheel at the same moment. The use of such a ratio makes it possible to make abstraction, when determining the state of the runway, of the speeds specific to each type of aircraft. Thus, the runway states obtained using the profiles [s,μ] are independent of the aircraft in question.

In one method of execution of the invention, said determination of the runway state by comparison is repeated over several sets of coupled data points [s,μ], where the sets correspond to different taxing phases. This approach makes it possible to accurately correlate determined runway states with several positions along the runway. Thus, various determined runway states can be associated to different parts of the runway corresponding to the respective taxing phases. In practice, even if we obtain runway states for a large number of positions along the runway, we will plan on separating the runway into three consecutive parts and on regrouping these states for each of these parts.

According to this provision, the state of the runway is associated with at least one information item about the aircraft position on said runway. Indeed, the aircraft do not all land on the same parts of the runway. Thus we associate the determined runway state with this position on the runway. By cumulating such additional information, it is thus possible to obtain a precise mapping of the landing runway.

According to one specific characteristic, the different take off or landing roll phases that correspond to different successive temporal intervals, or successive intervals of distances covered by the aircraft, or successive speed intervals of the aircraft. This provision makes it possible to perform calculations on these intervals to determine a runway state. Note, as illustrated later, that by choosing relatively low intervals (for example 5 seconds, 30 knots, 300 meters based on the nature of the interval), it is possible to estimate average environmental parameters (speed, tire stiffness, temperature, etc.) only once for said interval in order to simplify the calculations and the application of the at least one predetermined profile.

In one method of execution of the invention, a coupled data point comprised of one runway adhesion estimated value and one slip ratio value is obtained for each of several aircraft tires, at a given moment of aircraft on the take off or landing roll. This provision makes it possible to correlate the information obtained at each of the wheels, in particular to identify incorrect measurements/estimations, in order to improve the reliability of the estimation as set forth in the invention. Each wheel can lead to a runway estimation. However, a single estimation from the profiles [μ,s] of each wheel is preferred.

BRIEF DESCRIPTION OF THE DRAWINGS

Other particularities and advantages of the invention will appear further in the description below, illustrated by the attached drawings, where.

DETAILED DISCUSSION OF EMBODIMENTS

Figure 1:
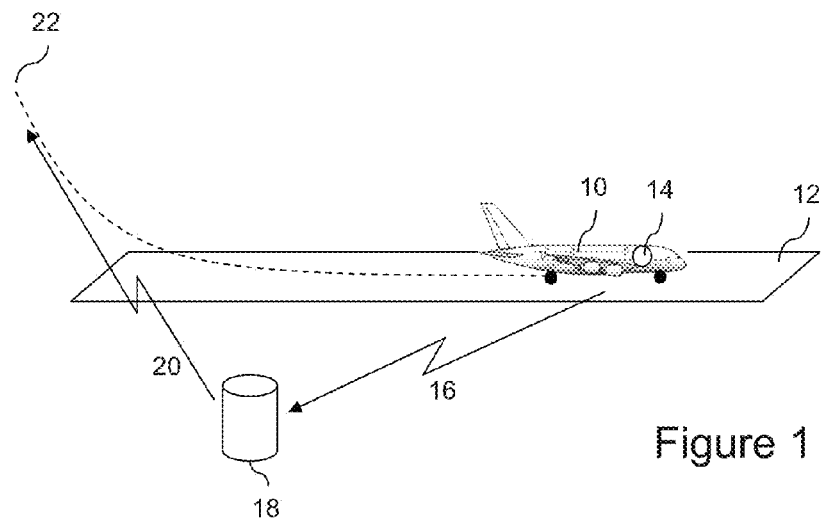
FIG. 1 represents an overall view of a system to implement this invention.

In FIG. 1, a plane 10 at the end of the landing roll/braking phase on an airport runway 12 is represented. Said plane 10 is equipped with a device 14, object of the invention, able to determine the state of the runway 12.

Through a communication link 16 provided for this purpose, the plane 10 that determines the state of the runway on-board, communicates said state to a central station on the ground 18 at the airport. As a variant, the measurement performed on the plane 10 can be forwarded to the ground station 18, who in turn determines the state of the runway as set forth in the invention. This ground station, after potential internal processing, communicates (20) a runway state to the planes 22 in the approach phase for landing or those ready for take-off.

The latter in turn will officiate as the plane 10 at the end of their landing or take-off to enhance the central station 18 with additional information about the state of the runway, in order to achieve in particular a more precise mapping of the runway 12.

Indeed, the central station 18 acquires and records said runway state information originating from the device on the plane 10 and on the preceding planes, then merges them, where the data from the other planes makes it possible to reconstruct temporal and spatial information about the runway. Generally, this treatment and merger phase is performed on the ground in order, for example, to be used for the FOQA ("Flight Operational Quality Assurance") type analyses. As a variant, such a phase can be performed on board the planes 22 that collect, in a de-coordinated manner the data from other planes (from the same airline for example) that have already landed.

As will be seen later, determining the state of a runway as set forth in an embodiment example of the invention involves:

An adhesion (or friction) coefficient "µ" at different moments of the take off or landing roll; and A slip ratio "s" at these same moments.

As mentioned in the publication FR 2 930 669, the adhesion coefficient used in this determination can be calculated from or correlated with:

The position of the plane 10 on the runway 12;

The speed of the plane during measuring (or estimating) of the adhesion; and

Figure 2:
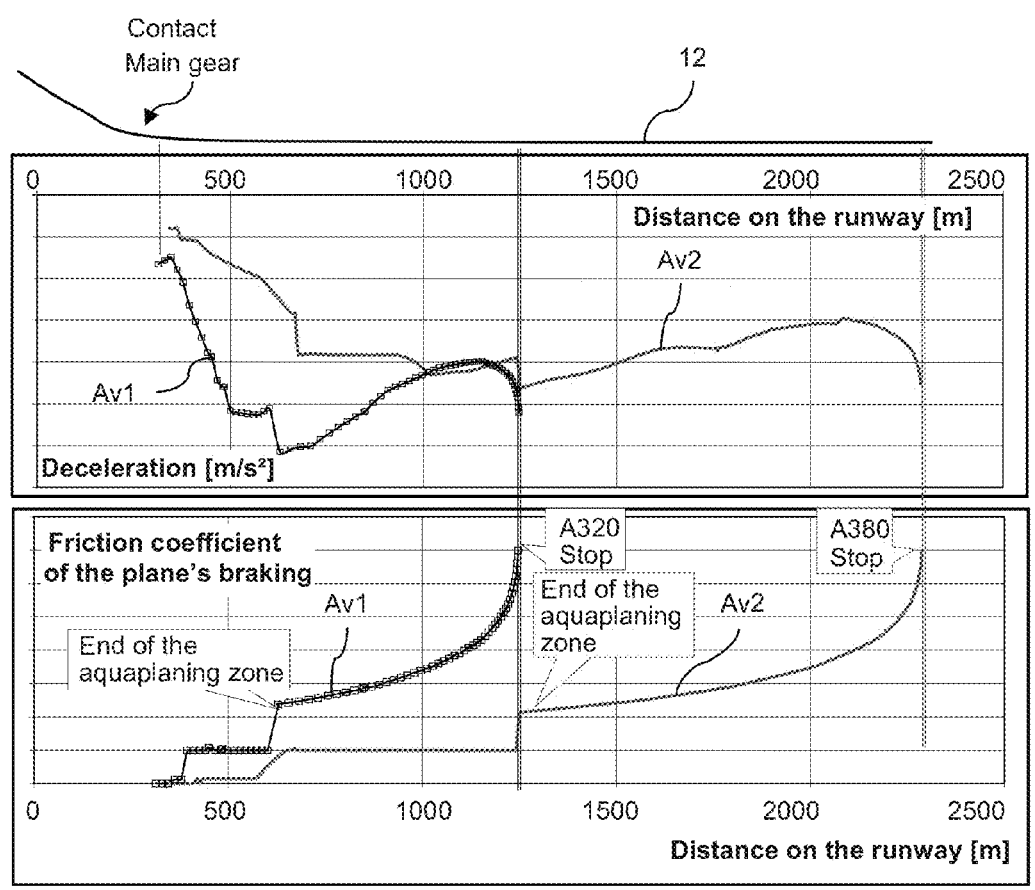
FIG. 2 is a graph that illustrates the differences in braking capacity and deceleration of two planes on one same runway.

The presence of drags said to be contaminant.

Where the position of the plane is concerned, as all planes do not taxi on the entire length of the runway, the description of the adhesion and therefore of the state of the runway is associated with a position on the runway, at least longitudinal, or even lateral, so as to create a mapping of the runway 12.

Where the speed of the plane during measurement (or estimation) of adhesion is concerned, in general said adhesion increases when the speed of the plane in relation to the ground decreases. Furthermore, based on the type and the thickness of the contaminant, aquaplaning, or a similar phenomenon can be encountered for (ground) speeds greater than a threshold value (variable from one plane to another), and for which the adhesion is almost non-existent. The test, for which the results are provided in FIG. 2 illustrates quite clearly the influence of speed. In this test, a single aisle plane Av1 of the A320 (commercial name) type lands on a runway contaminated with water ¼" deep (or approximately 6.5 mm) Said plane Av1 will stop on the first 1200 m of runway, with an adhesion coefficient µ of approximately 0.1 to 0.3 (regulation "water ¼" model, level announced by a pilot as "medium" to "poor"). A large carrier Av2 of the A380 (commercial name) type lands immediately after the plane Av1 on the same runway state. It experiences aquaplaning over 1200 m, with an adhesion in the 0.05 range (level "poor" if not "nil"), because of its higher approach speed. Therefore, on a same part of the runway, we have a factor of two to six between the adhesions seen by two different planes, if we do not take into account this speed effect. Therefore, during treatments according to this example, the measured data reported at the plane's speed on the ground are treated in preference to data according to time.

Figure 3:
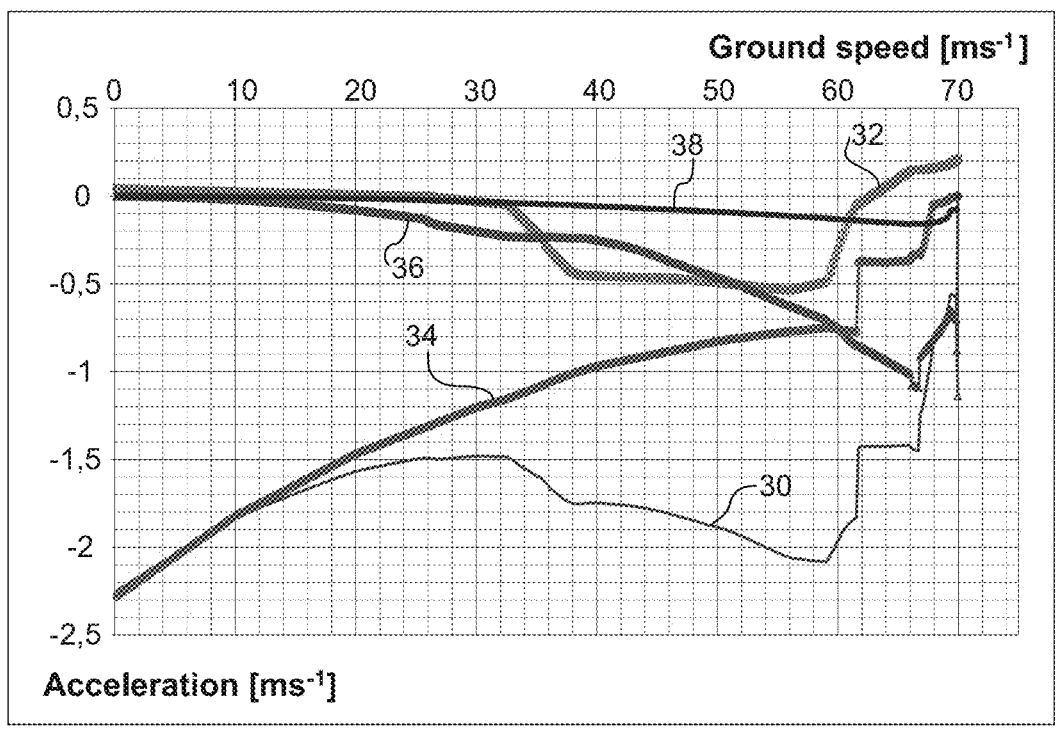
FIG. 3 represents the breakdown of a plane's deceleration when landing on a contaminated runway.

Lastly, where the presence of drag forces due to contaminants are concerned, they can be in projection, in displacement and in compression of the contaminant, and contribute to the plane's deceleration when it is taxiing on/in a contaminant of a certain thickness. The fact of not taking into account these drag forces causes a risk of overestimating the adhesion of the runway and therefore overestimating the deceleration ability for a following plane. Indeed, these drag forces and their impact vary from one plane to another, as for example according to the size of the latter, the height of the wings or the architecture of the landing gear, so that they can constitute an important part of the deceleration forces or, on the contrary, seem insignificant. In FIG. 3, the breakdown of the deceleration 30 of a plane 10 during landing on a contaminated runway 12, in the thrust 32 (or counter thrust) of the engine, the braking force 34 at the level of the wheels, the aerodynamic drag 36 and the contaminant drag 38 has been represented. We see that the contribution of the contaminant drags 38 can reach up to 10% of the total deceleration of the plane at high speed, beyond 50 m·s$^{-1}$, and thus impact the stopping distance by a hundred or so meters.

Figure 4:
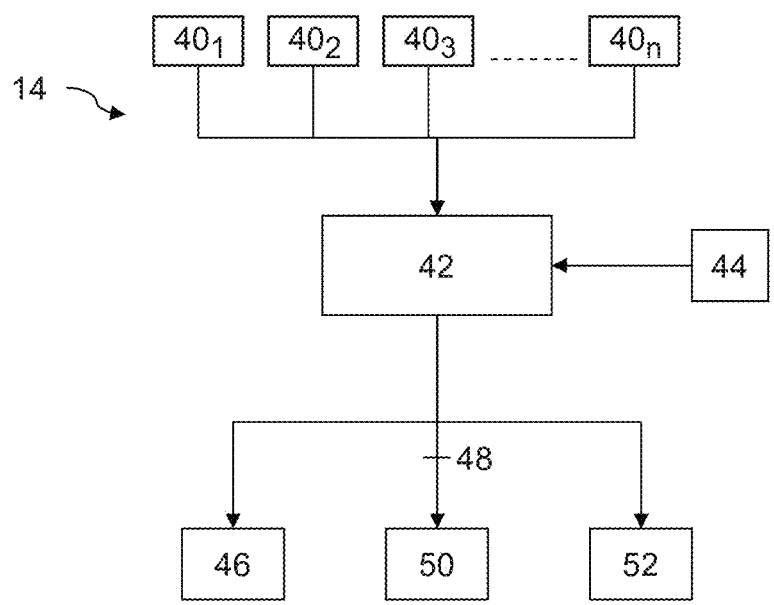
FIG. 4 is a schematic illustration of an example of a device that is the object of the invention.

In FIG. 4, an example of a device 14 that is the object of the invention with which the planes 10 are equipped is schematically represented. The device 14 includes a plurality of measurement systems $40_1$, $40_2$, ..., $40_n$, linked to a estimation calculation module 42. In particular, the device includes one or more inertial ADIRS stations ("Air Data Inertial Reference System") $40_1$ providing module 42 with aircraft ground speed, position, acceleration and temperature measurements; an FMS system ("Flight Management System") $40_2$; a physical tire size estimation equipment (internal temperature, internal pressure) $40_3$, a GPS module $40_n$ providing the position of the plane 10.

An Airport data base 44 linked to the calculation module 42 is also provided. Said base 44 or airport navigation system OANS ("On-board Airport Navigation System") provides the module 42 with basic airport data (for example the altitude)

and runway data (GPS position, orientation, slope gradient). As a variant, the FSM flight management system $40_2$ can provide such data.

In general, a lot of data can be provided and used to improve or fine tune the theoretical models, profiles and other algorithms mentioned hereafter. By way of illustration, the module 42 receives (from the airport 44 or other plane modules $40_1$) the location of the plane's 10 center of gravity CG, the slope of the runway 12, the outside temperature, wind data (force and direction), speeds (on the ground, true and calibrated aerodynamic; of the wheels), altitude data (pressure, . . . ), the mass of the plane 10, airport data, data on the runway used in particular the runway GPS coordinates, GPS position data of the plane, engine behavior parameters, information about the press-down of brake pedals, the movable surfaces state (such as the high-lift devices, the depth elevator, the airbrakes, the ailerons), representative Boolean information for example the contact of the main landing gear on the runway and of the opening of the engine's reverse doors, etc.

It is noted that all or part of this data, mainly the data from the dynamic data of the plane 10 or from outside conditions for example, are updated based on time in particular while the plane is taxiing: speeds, engine thrust levels, wind, temperature and tire pressure, etc. It is then provided to time and date stamp the measured data in order to make the comparison of some measurements with the plane's 10 ground speed at the same moment easier. Said measurements are carried out during the braking phase of the plane 10 at landing, for example up to a threshold speed value of around 10 knots (or 18.52 $km \cdot h^{-1}$). In particular, measurements and recording of the measured data can be started as soon as the plane 10 reaches a preset altitude over the airport. As a variant, detection of when the plane 10 first touches the runway 12 may trigger the recording of the measured data.

Figure 5:
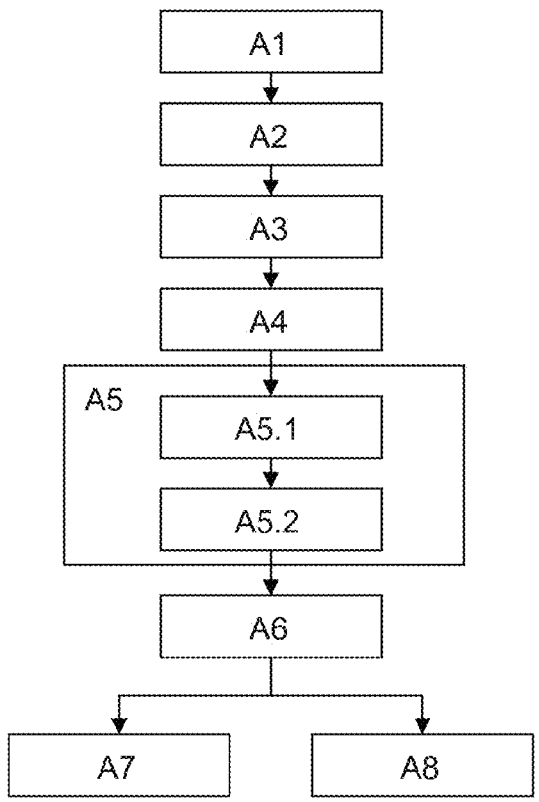
FIG. 5 represents, in the form of a logical diagram, treatment steps as set forth in the invention.

The calculation and estimation module 42 then processes all or part of said data according to various steps described hereafter, in particular in connection with FIG. 5. Processing of the measured data is initiated as soon as the ground speed of the plane 10 reaches a threshold value, in this case 20 knots, or approximately 37 $km \cdot h^{-1}$. This makes it possible to process all the data collected at once.

The result of the on-board processing for estimation of the state of the runway 12 involved performed by this calculation module 42 is provided in the form of one or more of the following pieces of information: A runway adhesion level. This information can be a level determined from among the levels above ("good"/"good-medium"/"medium"/"medium poor"/"poor"/"nil", or a numeric code between 0 and 5); A concise characterization of the state of the runway encountered (if recognized according to the algorithm implemented in the device 14), in particular of the contaminant detected, for example DRY (for a dry runway), WET (for a wet runway), WATER ¼" (for 6.3 mm of water), WATER ½" (for 12.7 mm of water), SLUSH ¼" (for 6.3 mm of melted snow), SLUSH ½" (for 12.7 mm of melted snow), COMPACTED SNOW (for compacted snow) and ICY (for ice), where said runway state designation (usually type and thickness of the contaminant) is derived from a known nomenclature.

A display 46 of this determined information about the runway state is performed in the cockpit of the plane 10. The pilot then validates (48) or not said displayed data in relation to his judgment and his visual data, meaning somewhat in accordance with his automatic functions of "Reported Braking Action". The runway state information validated by the pilot is then forwarded (50) to the outside the plane 10, to the airport control and management center, using traditional means, for example radiofrequency. As a variant, the transmission (50) of the runway state information can be automatic without validation from the pilot. Potential storage (52) of the calculated information is performed in the plane 10.

We will now describe, in reference to FIGS. 5 through 9, an example of the processing performed on board the plane 10 during the approach and landing phase on the runway 12. During a step A0 not represented and performed during the approach of the plane 10 prior to landing, estimation data on the runway state 12 is acquired via the on-board system through communication with the airport. Said data is a result in particular of the merger of several items of runway state information provided by various planes that have already landed. This merging makes it possible to provide the temporal and spatial evolution of the runway state for manual use by the pilot or potentially automatic use by a landing assistance system, of the "Brake-to-Vacate" type (a system that allows a pilot to designate and reach a runway 12 ramp).

For example, a textual display to the pilot of the plane 10, as follows, specifies, for an airport and a given runway 32R, the estimations of the prior two planes, in this case an A330 (commercial name) followed by an airplane Av1 mentioned previously, for three parts of the runway 12:

|  | LFBO | 32R |
| --- | --- | --- |
| A330 | 10 h 32 GMT | xx/WET/WET |
| A320 | 10 h 39 GMT | WET/WET/xx |

As a variant, a graphic display on an airport map for example, can be proposed after the spatial and temporal merging of the data, using in particular a color code to reproduce the state of various parts of the runway.

The data acquisition step A1 takes places in part before the plane 10 touches the runway 12, in particular for the acquisition of static data (position, altitude, and slope of the runway; airplane mass, etc.), and in part after it has touched the runway during the actual landing and braking phase of the plane 10 on the runway 12, for the acquisition of the time dependent dynamic data. This last acquisition is performed during the plane's deceleration up to a threshold ground speed of 10 knots for example. This data can be filtered to eliminate part of the noise due to the measurements and the instrumentation, and/or to identify some sequences (stabilized zones, aquaplaning for example) and/or to perform specific processing according to the zones, if need be (transitory distinction and stabilized zones for example). Different data pertaining to at least one physical size of the plane is thus measured or calculated at each time point during the landing roll, for example every tenth of a second.

This step A1 includes for example:
Acquisition of the deceleration, the speed $V_x$ on the ground and the position (latitude and longitude) of the plane 10;
Acquisition and/or calculation of the vertical load Fz applied to the wheels of the plane, either as a whole, or for each wheel. For example, ad hoc sensors can be planned for at the level of each wheel to determine the vertical load that is applied to them. As a variant, an overall determination can rest on the use of a load distribution model so as to distribute the plane's weight and potential vertical aerodynamic loads on each landing gear and on each wheel of each gear;
Acquisition and/or calculation of the braking force, either as a whole, or for each wheel. Calculation of the braking force $F_b$ at the level of each wheel can be performed using the formula $F_b = T/B_r$, where T is the torque applied by the braking system and is measurable at each wheel by an ad hoc sensor and $R_r$ represents the dynamic taxiing radius of the wheel (for example in accordance with a model taking into account the tire's properties, such as crushing). As a variant, the braking force $F_b$ can be calculated globally for the wheels, using the balance of the forces, as shown in FIG. 3. That is to say that $ma=T-D_{aero}-F_b-D_{cont}-m \sin \gamma$, where m is the mass of the plane 10, a is the acceleration (or deceleration), T is the engine thrust (for example obtained by the position of the throttle and the engine parameters such as the engine speed N1), $D_{aero}$ is the aerodynamic drag (for example obtained through modelization from various parameters, for example the angle of incidence α, the pitch attitude θ, airbrake output information), $D_{cont}$ is the drag resulting from the runway contaminant (for example based on a runway profile corresponding to an announced runway state) and γ is the slope of the runway;

Acquisition of the speeds of each wheel, for example the speed in rotation ω or the circumferential speed $V_c$ that derives directly therefrom ($V_c=\omega \cdot R_r$, where $R_r$ is the dynamic taxiing radius of the wheel/tire);

Acquisition of data pertaining to the runway environment, for example the surrounding temperature, the type or texture of the runway's surface;

Acquisition of data pertaining to the tires, for example their type and properties (mechanical stiffness property, crushing properties, thermal characteristics, etc.) and the dynamic values (internal temperatures, internal pressures of the tires).

At step A2, we estimate, at each time point, the adhesion coefficient μ of the runway 12, with the formula $$\mu = \frac{F_b}{F_z}.$$

Thus, based on the origin of the calculation of the forces $F_b$ and $F_z$, the result of this step A2 is either an overall adhesion coefficient for all the wheels, or an adhesion coefficient $\mu_i$ for each wheel i in question.

It is noted here that thanks to the time and date stamp of the measured data, it is easy to make the connection between each adhesion coefficient of the adhesion profile thus evaluated and the corresponding position of the plane 10 on the runway 12. As a variant, we can use techniques of the "Flight Path Reconstruction" or FPR type which make it possible to ensure that the measured data is consistent from a kinematic point of view, for example by making it possible to reduce the measurement errors through constant or relative means.

The adhesion coefficients evaluated may however result from two different limitations, one called adhesion when the sliding or adhesion status of the runway limits braking, and the other called torque when all the braking torque requested from the corresponding commands is restored. These limitations are identified through calculation of the slip ratio "s" ("slip ratio") as illustrated hereafter in reference to FIG. 6.

Thus step A3 consists of the calculation of the slip ratio "s" for each time point:

$$s = \frac{V_x - V_c}{V_x}$$

where $V_x$ is the aircraft speed on the ground at that instant of the take off or landing roll and $V_c$ is the linear speed (meaning the peripheral or circumferential speed) of the wheel at the same moment. For a given taxiing time point, we thus obtain several slide $\{s_j\}$ reports, one for each wheel j of the plane 10.

The slip ratio "s" is representative of the operational conditions of the plane's braking system. Indeed, s varies between 0 and 1, where 0 means that the wheel is free in rotation ($V_c=V_x$) and 1 means that the wheel is stopped ($V_c=0$).

At the next step A4, we combine the coefficients μ with the slip ratios s to obtain a set of coupled data points [μ,s] for the various taxiing moments. If measurements and calculations are performed for each wheel ($\{\mu_i\}$ and $\{s_j\}$), so several coupled data points [$\mu_i,s_i$] are obtained for the same moment, where i identifies one of the plane's wheels.

Figure 6:
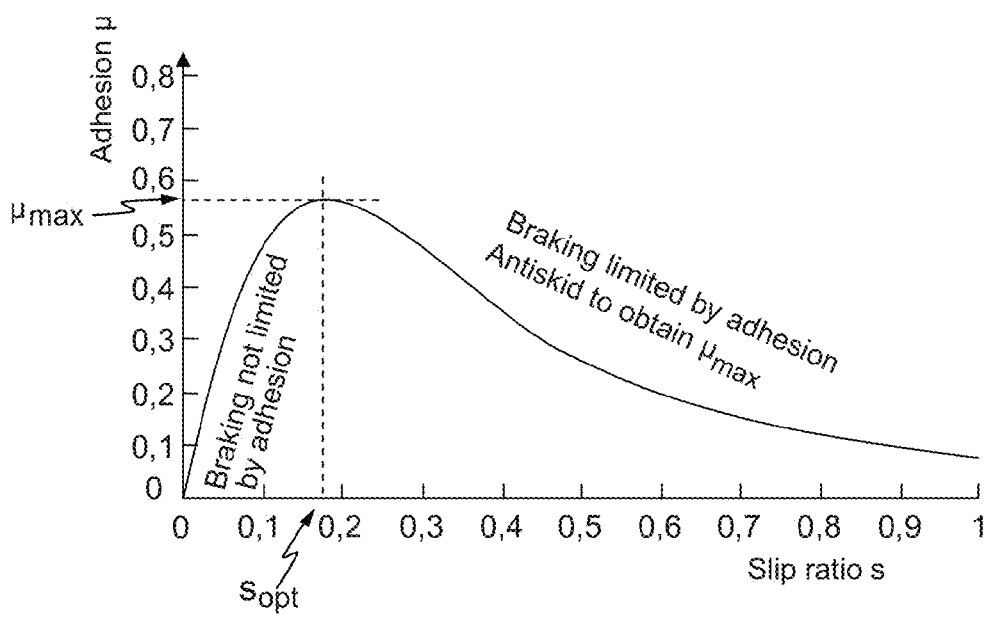
FIG. 6 illustrates the theoretical profile of the adhesion coefficient-slip ratio relation, implemented in the process of FIG. 5.

FIG. 6 illustrates an example of the theoretical profile of the ratio μ=f(s).

This curve presents a maximum of adhesion $\mu_{max}$ for an optimal slip ratio $s_{opt}$. Two types of braking can be underlined using this figure. For the slip ratios under $s_{opt}$ (left part on the figure), braking is effective in that the deceleration obtained by adhesion of the tires corresponds to that requested by the pilot. We speak of braking not limited by adhesion ("non friction limited"). In this zone, if the pilot increases the braking pressure, the adhesion and deceleration are improved.

For slip ratios greater than $s_{opt}$ (right part on the figure), braking is said to be limited by the adhesion ("friction limited"). Adhesion on the runway is insufficient to provide the requested deceleration. In this case, an antiskid mechanism ("anti-skid") is usually implemented to regulate braking pressure and provide the best deceleration possible, if possible around $\mu_{max}$. In this friction limited zone, additional braking pressure degrades the braking even more (reduction of the adhesion).

Taking into account the relation between the adhesion μ and the slip ratio s (meaning the operational performance of the braking system) as set forth in the invention makes it possible to fine tune the estimation of the runway state compared to the use of an adhesion coefficient alone.

As the adhesion and the slip ratio are strongly correlated to the speed of the plane 10, the ulterior processing of the coupled data points [μ-s] is performed at intervals, in which an average speed can be considered. Furthermore, this approach by intervals makes it possible to take into account the fact that the runway state may not be consistent along the runway.

According to various variants, these may be temporal intervals (dividing the landing roll phase into 5 second intervals for example), metric intervals (dividing the landing roll phase into 300 m sections of taxiing for example) or speed intervals (for example dividing the landing roll phase into speed intervals of 150-120 knots, then 120-90 knots, etc.). In the remainder of the explanations for the sole purpose of illustration, reference will be made to speed intervals.

However, in a variant to the division into intervals, the adhesion μ may be considered as a function of the slip ratio and said speed. The identification of a similar predetermined theoretical curve as described later will be made in this case in a tridimensional space.

At step A5, the profile of the coupled data points [μ,s] (taking into account the set of wheels if necessary) for the speed interval involved is compared to at least one predetermined theoretical profile in order to determine a runway state. Different approaches can be implemented, as illustrated later in reference to FIGS. 7 through 9.

During a first sub-step A5.1, a theoretical relation μ-s is created. For example, it may be based on a runway-tire contact theory known as Brush Model. This theoretical model takes as input common environmental parameters of the plane during the take off or landing roll, for example the mechanical properties of the tires, the surrounding temperature, the texture of the runway's surface, the plane's ground speed, the tires' slip ratios, the tire pressure of each wheel, the vertical loads on each wheel.

As these various parameters are acquired, calculated or estimated at each take off or landing roll moment (or overall for a given speed interval), a tire-runway contact model is thus established. By way of illustration, this model is of the form $f(s, \mu_k, \mu_s, a, F_z, c_p)$ where, at the corresponding take off or landing roll moments, $\mu_k$ is a dynamic adhesion coefficient, $\mu_s$ is a static adhesion coefficient, a represents the length of contact between the tire of the aircraft's wheel and the runway, $F_z$ is a vertical load applied on the wheel's axis and $c_p$ is a mechanical stiffness value relative to the wheel's tire. It is noted that the above-mentioned adhesion $\mu$ combines the dynamic coefficient and the static coefficient. Thus, by varying the slip ratio s and using other measured or calculated values, we can obtain a theoretical curve $\mu$-s for a set of conditions.

This model may be further fine-tuned using tribology and structural mechanical techniques of the tires. For example, the dynamic adhesion coefficient can be fine-tuned as follows:

$$\mu_k = f\left(E, V_s, T, P, \frac{\Delta_h}{l}\right)$$

where E is the Young's modulus in relation to the material (rubber) of the tire's taxiing band, $V_s$ is the slip speed ($V_x - V_c$), T is the surrounding temperature, P is the contact pressure on the tire-runway surface (obtained for example by measuring the internal pressure of the tire and copying a pressure distribution on the length of contact of the tire), and $$\frac{\Delta_h}{l}$$

is a measurement of the runway's surface macro texture (from the knowledge of this texture or a supposition of texture).

Furthermore, knowledge of the tire's structure makes it possible to fine tune the value a of the length of the contact area $a=f(F_z, P_t)$ where $P_t$ is the internal air pressure of a tire being considered; and also the mechanical stiffness of the tire: $c_p=f(E, F_z, P_t)$.

Lastly, the mechanical properties of the material (rubber) may vary based on the operational environment. Fine-tuning of the above parameters consists in defining:

$$E = f\left(T, T_r, V_s, \frac{\Delta_h}{l}\right);$$

where $T_r$ is the internal temperature of said material.

By combining all these elements, we can obtain a complex model able to predict the response of the braking system (meaning the curve $\mu=f(s)$) based on the environmental conditions (temperature, nature of the runway's surface, contaminant, type of tire) and the common operational conditions of the plane (speed, vertical load, tire pressure and temperature).

This theoretical model is therefore used in step A5.2 to determine the state of the runway for each part of the runway that corresponds to the speed intervals in question.

This determination rests on the fact that the profile of the curve $\mu$-s varies based on the state of the runway (i.e. the slip capacity on the runway).

Figure 7:
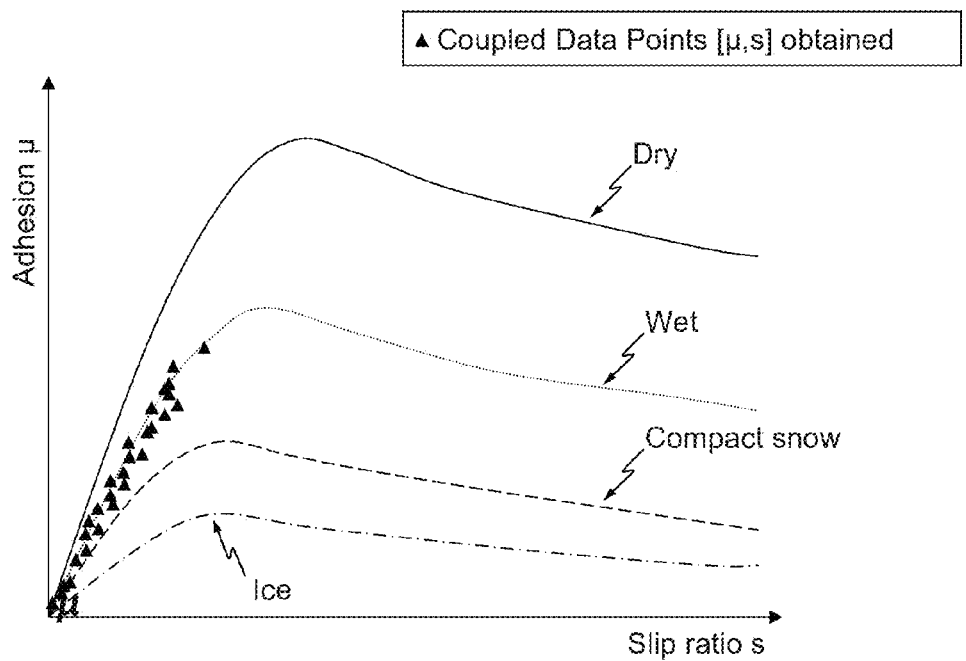
FIG. 7 illustrates a first method of execution of determining a runway state as set forth in the invention.

FIG. 7 illustrates a first method of execution of this determination.

Several theoretical curves $\mu$-s are pre-set based on the afore-mentioned model, using an average speed on the interval in question, and based on various ideal runways states (for example compact snow, ice, wet and dry in the case of the figure).

In this method of execution, determining a runway state by comparison includes the selection, among said set of predetermined and associated profiles, each at a different runway state, of the predetermined profile closest to the coupled data points [$\mu$,s] profile obtained in step A4.

Thus we compare the points [$\mu$,s] with these different theoretical curves, for example by calculating a distance L2 between these points and their corresponding points on the various curves, so as to determine the curve that most resembles the measurements and calculations obtained.

In this example, the curve that corresponds to the state of the "wet" runway most resembles the coupled data points [$\mu$,s] obtained.

We thus obtain a runway state for the interval in question, which can be correlated with a specific position on the runway.

This comparison is reiterated for each speed interval (where the theoretical curves can then be recalculated to take into account the operational and environmental conditions specific to said interval), so as to obtain a set of runway states for corresponding positions along the runway.

Figure 8:
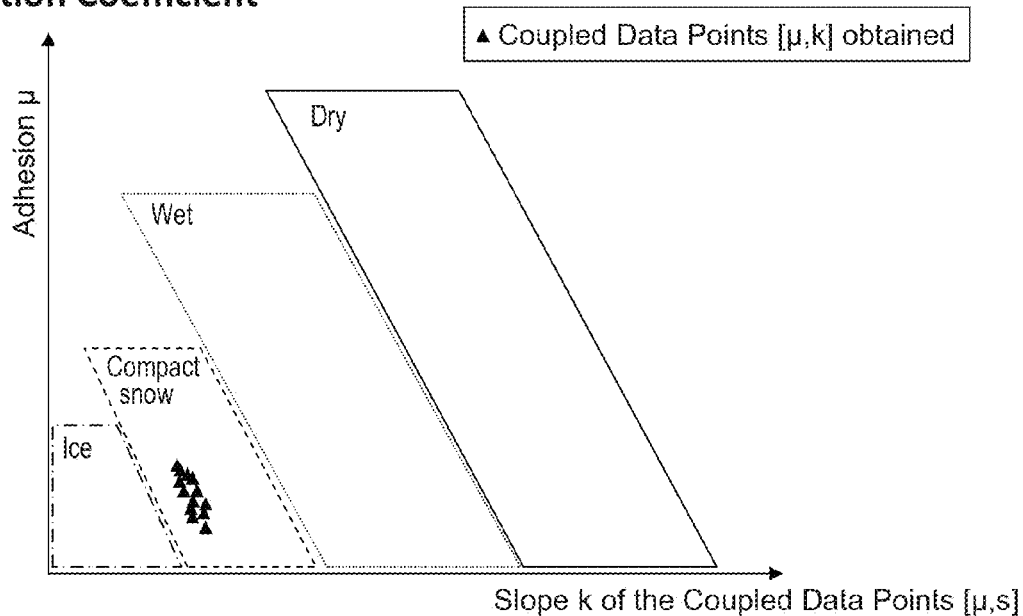
FIG. 8 illustrates a second method of execution of determining a runway state as set forth in the invention.

FIG. 8 illustrates a second method of execution of this determination, based on the initial slope "K" of the curve $\mu=f(s)$ (meaning the slope for the zone $s<s_{opt}$).

This second method of execution rests indeed on the assessment that this initial slope (usually when braking for landing the pilot stays in the zone that is not limited by adhesion) is strongly correlated to the state of the runway: the more this slope is weak, the more the runway is slippery.

Therefore, we can determine, for the speed interval in question, the theoretical curves based on the afore-mentioned model then the zones taken by their initial slopes k. The figure represents these zones in the space k-$\mu$.

It turns out that this initial slope also depends on the mechanical stiffness of the tires (dependent on the type of tire, the temperature, the texture of the runway surface and the speed of the airplane). Thus to improve the accuracy of the detection of the runway state, it is planned that these predetermined zones be defined using the at least one predetermined profile (the theoretical model), that varies according to the calculated mechanical stiffness value.

In this method of execution, the invention then plans to obtain several slope values "k" of the coupled data points [s,$\mu$] profile calculated in step A4 for several adhesion values $\mu$, so as to obtain several coupled data points [k,$\mu$]. The slopes k can be obtained by linear regression between the successive coupled data points around a value $\mu$ being considered.

Then, the invention includes the determination, among a set of zones predetermined in space [k,$\mu$] and each associated to a different runway state, of an appurtenance zone of a majority of said coupled data points [k,$\mu$].

In the example in the figure, the set of slopes k for the common interval is located in the zone corresponding to the "compact snow" runway state.

Thus we obtain a runway state for the interval in question, which can be correlated with a specific position on the runway.

This approach is reiterated for each speed interval (the theoretical zones being recalculated at that time), so as to obtain a set of runway states for corresponding positions along the runway.

Figure 9:
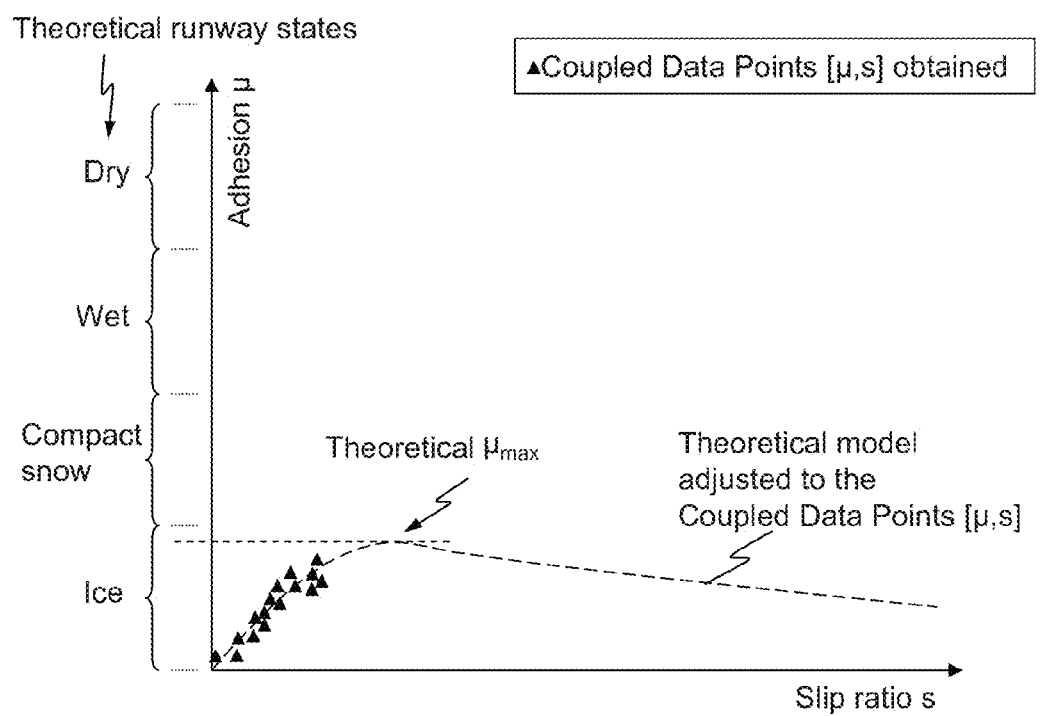
FIG. 9 illustrates a third method of execution of determining a runway state as set forth in the invention.

FIG. 9 illustrates a third method of execution of this determination based on the adjustment of the theoretical model on the coupled data points [μ, s] calculated in step A4.

Thus, the predetermined profile or theoretical model is a parametric model for which a part of the parameters is set for the interval in question (for example the temperature, the average speed, the contact pressure, etc.), and determination of a runway state by comparison includes the adjustment (or "fitting") of the parametric profile on said coupled data points [s,μ] and determination of a runway state from at least one characteristic value of the adjusted profile.

This characteristic value may vary in nature, for example an adjusted parameter of said parametric profile ($\mu_k$), a maximal adhesion value $\mu_{max}$ or an initial slope value k. By way of illustration, we consider the maximal adhesion $\mu_{max}$ as a characteristic value on which determination of the runway state is based.

This maximal value is indeed directly connected to the state of the runway when we take into account the physical conditions of the airplane, the tires and the runway (which is the case in the afore-mentioned theoretical model).

Traditional parametric model adjustment techniques are used to adjust the theoretical model above to the coupled data points [μ,s] obtained in step A4. The unknown parameters of the theoretical model (in particular $\mu_k$) are then obtained.

Once all the parameters are known, the maximum $\mu_{max}$ of the curve of this adjusted model is calculated and then compared to corresponding value intervals each at different theoretical states of the runway, as shown in the figure (in the example, $\mu_{max}$ corresponds to an icy runway).

We thus obtain a runway state for the interval in question, which can be correlated with a specific position on the runway.

This approach is reiterated for each speed interval (some parameters of the theoretical model are then updated, for example the average speed, at this time), so as to obtain a set of runway states for corresponding positions along the runway.

Considering the large number of runway states that can be obtained for various positions along the runway in these three methods of execution, we can proceed with a regrouping of these runway states for three distinct portions of said runway, for example the first third of the runway, the middle part, and the last third of the runway. This regrouping may simply consist in preserving the state of the runway that has the most occurrences among the runway states that correspond to positions inside the part of the runway in question.

Of course, the various methods of the FIGS. 7 through 9 described previously may be implemented separately, in combination or be means of reciprocal checking.

As described above, the invention also makes it possible to thus estimate a runway state taking into account the operational performance of the braking system, the physical conditions of the runway, the airplane in braking phase and the static and dynamic characteristics of the tires.

At the end of the take off or landing roll period on the runway (as of a certain threshold ground speed for example), the data estimated is then automatically recorded in step A6.

Then in step A7, we display, potentially through the action of the pilot, on the screen of the cockpit of the plane 10, the result of the estimations. The pilot may thus receive part or all of the following information:
- The runway adhesion level, by linking it, if necessary, to the part of the runway being considered; and
- The concise characterization of the runway state encountered.

Upon action by the pilot validating all or part of the information about the state of the runway he was given, it will be forwarded, in step A8, to the outside of the plane (airport control center or approaching planes for example) along with the quality of the estimations found.

Transmission of the data can be performed by radio or via a system such as ACARS ("Aircraft Communications Addressing and Reporting System").

In the example above corresponding to the plane Av2 of FIG. 2, the runway state is clearly identified on a part of the runway (in this case from 400 to 2000 m from the threshold.

The information forwarded may then be presented as follows:

Airport XXX, Runway YYY, Airplane ZZZ
Date, Time
400-2000 m from the contact
State of the runway identified as WATER ¼".

The preceding examples are only methods of execution of the invention and are not limited thereto.

The invention claimed is:

1. A method for determining a state of a runway including the following steps:
   acquiring, using at least one measurement system, measurement data relating to at least one physical parameter of an aircraft, during an aircraft roll during takeoff or landing on the runway;
   obtaining, using the acquired data, a plurality of estimated adhesion values (μ) of the runway, corresponding to moments during the aircraft roll;
   obtaining, using the acquired data, a slip ratio value(s) of at least one aircraft wheel for each of the moments during the aircraft roll, wherein the at least one wheel includes at least one tire;
   computing coupled data points comprising the adhesion values (μ) and the slip ratio values (s) for each of the moments during the aircraft roll;
   determining a runway state by comparing the coupled data points with predetermined profiles, and selecting one of the predetermined profiles which corresponds to the coupled data points, wherein the selected predetermined profile indicates the runway state;
   displaying, on a display in a cockpit of the aircraft for pilot validation, the determined state of the runway; and
   communicating, via a communication device, the state of the runway outside of the aircraft to at least one of an airport ground station and one or more other aircraft for use by the one or more other aircraft for control when taking off or landing on the runway; and
   wherein the determination of the runway state by comparison includes calculating slope values (k) representative of the coupled data points for a plurality of adhesion (p) values; and selecting from among a set of zones of slope values (k) and corresponding adhesion values (p), wherein each zone is associated with a different runway state, and the selected predetermined profile corresponds to the zone including the calculated slope values (k) for the plurality of adhesion (p) values.

2. The method according to claim 1, wherein the determination of the runway state by comparison includes selecting, from among a set of predetermined profiles each associated with a different runway state, the predetermined profile that most resembles a profile of the coupled data points.

3. The method according to claim 1, wherein at least one mechanical stiffness pertaining to the at least one tire of the aircraft wheel is calculated using measurement data acquired during the aircraft roll, and the predetermined zones are defined using the at least one predetermined profile, which varies according to the calculated mechanical stiffness.

4. The method according to claim 1, wherein the predetermined profile is a parametric profile, and the determination of the runway state by comparison includes adjusting of the parametric profile to correspond with the coupled data points and the adjusted parametric profile is compared to the at least one predetermined profile.

5. The method according to claim 1, wherein said predetermined profile is in the form of a function f(s, μk, μs, a, Fz, cp) where, at the corresponding moments of aircraft roll, μk is a dynamic adhesion coefficient, μs is a static adhesion coefficient, a represents the contact area between the at least one tire and the runway, Fz is a vertical load applied to the axis of the wheel and cp is a mechanical stiffness value pertaining to the at least one tire.

6. The method according to claim 1, wherein the slip ratio value (s) at a moment of taxiing is obtained by calculating the following ratio:

$$\frac{V_x - V_c}{V_x}$$

where Vx is ground speed of the aircraft at said specific moment of taxiing and Vc is linear speed of the wheel at the moment of taxiing.

7. The method according to claim 1, wherein said determination of the runway state by comparison is repeated over several sets of coupled data points, where the sets correspond to distinct taxiing phases of the aircraft roll.

8. The method according to claim 7, wherein the at least one predetermined profile includes predetermined profiles corresponding to different determined runway states and different portions of the runway.

9. The method according to claim 1, wherein the at least one measurement system is a plurality of measurement systems including an Air Data Inertial Reference System providing aircraft ground speed, position, acceleration and temperature measurements, a Flight Management System, physical tire size estimation equipment providing internal tire temperature and internal tire pressure, and a Global Positioning System module providing position of the aircraft.

10. The method according to claim 1, wherein the communicating device is radio or an Aircraft Communications Addressing and Reporting System.

11. An apparatus for determining a state of a landing runway, including:
at least one measurement system that acquires measurement data pertaining to at least one physical parameter of an aircraft, the measurement data corresponding to a plurality of moments during an aircraft roll on takeoff or landing of the aircraft on the runway;
a calculator that obtains, using the acquired data, a plurality of estimated adhesion values (μ) of the runway for each of the moments of the aircraft roll;
a calculator that obtains, using the acquired data, a slip ratio value (s) of at least one aircraft wheel, the wheel including a tire, for each of the moments of roll, and that calculates from (s) and (μ) a plurality of coupled data points;
a determination module configured to determine the state of the runway by comparing the coupled data points to at least one predetermined profile;
and
a communication device that communicates the state of the runway outside of the aircraft to at least one of an airport ground station and one or more other aircraft for use by the one or more other aircraft for control when taking off or landing on the runway; and
wherein the determination module is configured to obtain a plurality of slope values (k) of the coupled data points profile for a plurality of adhesion (μ) values; and to determine, from among a set of zones of slope values (k) and corresponding adhesion (μ) values the one zone of the set of zones which includes a slope value (k) and corresponding adhesion (μ) values representative of the calculated coupled data points, wherein each set is associated with a different runway state.

12. The apparatus according to claim 11, wherein the determination module is configured to select, from among a set of predetermined profiles wherein each predetermined profile is associated with a different runway state, one of said set of predetermined profiles that most resembles a profile of the coupled data points.

13. The apparatus according to claim 11, wherein the predetermined profile is a parametric profile, and the determination module is configured to adjust the parametric profile to conform to the calculated coupled data points and to determine the runway state from at least one characteristic value of the adjusted parametric profile.

14. An aircraft including at least one apparatus for determining a runway state according to claim 11.

15. An aircraft piloting assistance system, including at least one apparatus according to claim 11 on board said aircraft, and one ground station configured to receive an information item about a runway state determined by said system and able to transmit said information item about the runway state to at least one other aircraft in an approach phase.

16. The method according to claim 11, wherein the at least one measurement system is a plurality of measurement systems including an Air Data Inertial Reference System providing aircraft ground speed, position, acceleration and temperature measurements, a Flight Management System, physical tire size estimation equipment providing internal tire temperature and internal tire pressure, and a Global Positioning System module providing position of the aircraft.

17. The method according to claim 11, wherein the communicating device is radio or an Aircraft Communications Addressing and Reporting System.

18. A method to determine a state of a runway comprising:
acquiring, using at least one measurement system, measurement data representative of a physical parameter of an aircraft for a series of moments during an aircraft roll phase on the runway;
calculating an adhesion (μ) value of at least one of the wheels of the aircraft to the runway at each of the series of moments, wherein the calculation uses the measured data;
calculating a slip ratio value (s) representing slippage between the at least one of the wheels and the runway at each of the series of moments, wherein the calculation uses the measured data;

calculating a coupled data point for each of the series of moments, wherein each coupled data point includes the adhesion (μ) value and the slip ratio (s) value for the corresponding moment;

determining a slope value (k) for a group of the coupled data points, wherein the group consists of coupled data points having a slip ratio value (s) no greater than a slip ratio value (s) for the coupled data point having a maximum adhesion (μ) value;

selecting a runway state profile from a group of runway state profiles based on the determined slope value (k), determining the runway state based on the selected runway state profile displaying, on a display in a cockpit of the aircraft for pilot validation, the determined state of the runway; and communicating, via a communication device, the state of the runway outside of the aircraft to at least one of an airport ground station and one or more other aircraft for use by the one or more other aircraft for control when taking off or landing on the runway.

19. The method to determine a state of a runway of claim 18 wherein the selection of the runway state profile includes matching the determined slope value (k) to slope values (k) for each of the runway state profiles, and selecting the runway state profile having the slope value (k) nearest and smaller than the determined slope value (k).

20. The method to determine a state of a runway of claim 18 wherein the runway state profiles are each characterized by a zone of slope values (k) and corresponding adhesion (μ) values and the selection of the runway state profile includes identifying the zone which includes the determined slope value (k) and corresponding adhesion (μ) values for the coupled data points.

21. The method according to claim 18, wherein the at least one measurement system is a plurality of measurement systems including an Air Data Inertial Reference System providing aircraft ground speed, position, acceleration and temperature measurements, a Flight Management System, physical tire size estimation equipment providing internal tire temperature and internal tire pressure, and a Global Positioning System module providing position of the aircraft.

22. The method according to claim 18, wherein the communicating device is radio or an Aircraft Communications Addressing and Reporting System.

* * * * *